(12) United States Patent
Schultz (10) Patent No.: US 7,043,584 B2
(45) Date of Patent: May 9, 2006

(54) INTERRUPT PRIORITIZATION IN A DIGITAL DISK APPARATUS

(75) Inventor: Mark Alan Schultz, Carmel, IN (US)

(73) Assignee: Thomson Licensing, Boulogne-Billancourt (FR)

(*) Notice: Subject to any disclaimer, the term of this patent is extended or adjusted under 35 U.S.C. 154(b) by 344 days.

(21) Appl. No.: 09/950,992

(22) Filed: Sep. 13, 2001

(65) Prior Publication Data

US 2002/0065969 A1     May 30, 2002

Related U.S. Application Data

(63) Continuation-in-part of application No. 09/024,232, filed on Feb. 17, 1998, now Pat. No. 6,320,826.

(60) Provisional application No. 60/039,573, filed on Feb. 18, 1997.

(51) Int. Cl.
*G06F 13/24* (2006.01)
(52) U.S. Cl. ............... 710/261; 710/264; 710/265
(58) Field of Classification Search ............ 710/48, 710/116, 123, 260–269; 386/52, 70, 95–96
See application file for complete search history.

(56) References Cited

U.S. PATENT DOCUMENTS

| | | | | |
|---|---|---|---|---|
| 3,984,820 A * | 10/1976 | Stanley et al. | ............... | 710/265 |
| 4,799,148 A * | 1/1989 | Nishioka | ............... | 710/265 |
| 4,914,580 A * | 4/1990 | Jensen et al. | ............... | 710/265 |
| 5,083,261 A * | 1/1992 | Wilkie | ............... | 710/265 |
| 5,530,875 A * | 6/1996 | Wach | ............... | 710/264 |
| 5,581,771 A * | 12/1996 | Osakabe | ............... | 710/265 |
| 5,691,972 A | 11/1997 | Tsuga et al. | | |
| 5,768,466 A * | 6/1998 | Kawamura et al. | ............... | 386/69 |
| 5,861,912 A * | 1/1999 | Nanba | ............... | 348/96 |
| 5,907,660 A * | 5/1999 | Inoue et al. | ............... | 386/109 |
| 5,923,627 A * | 7/1999 | Miwa et al. | ............... | 386/70 |
| 5,928,321 A * | 7/1999 | Ozcelik et al. | ............... | 718/1 |
| 5,940,610 A * | 8/1999 | Baker et al. | ............... | 713/600 |
| 5,966,352 A | 10/1999 | Sawabe et al. | | |
| 5,974,015 A * | 10/1999 | Iizuka et al. | ............... | 386/96 |
| 5,995,709 A * | 11/1999 | Tsuge | ............... | 386/95 |
| 6,002,877 A * | 12/1999 | Yamagata | ............... | 710/265 |
| 6,006,004 A | 12/1999 | Moriyama et al. | | |
| 6,012,137 A * | 1/2000 | Bublil et al. | ............... | 712/36 |
| 6,034,942 A | 3/2000 | Yoshio et al. | | |
| 6,076,062 A * | 6/2000 | Van Steenbrugge | ............... | 704/500 |
| 6,118,927 A * | 9/2000 | Kikuchi et al. | ............... | 386/95 |
| 6,263,396 B1 * | 7/2001 | Cottle et al. | ............... | 710/263 |
| 6,304,714 B1 * | 10/2001 | Krause et al. | ............... | 386/52 |
| 6,363,207 B1 * | 3/2002 | Duruoz et al. | ............... | 386/68 |

OTHER PUBLICATIONS

U.S. Appl. No. 09/024,232 dated Feb. 17, 1998 (Priority Document).

* cited by examiner

*Primary Examiner*—Rehana Perveen
*Assistant Examiner*—Nimesh G. Patel
(74) *Attorney, Agent, or Firm*—Joseph S. Tripoli; Robert B. Levy; Jorge T. Villabon (57) ABSTRACT

In an digital video disk player the timely acquisition of specific data types is particularly important during trick mode operation. During trick modes a controller can provide enhanced control capability by employing interrupt requests having priorities that differ from those used during normal play mode operation. A method for controlling a microcontroller in digital disk apparatus having at least two reproducing modes. The method comprises the steps of prioritizing the microcontroller interrupts during a first reproducing mode, and in a second reproducing mode reordering the microcontroller interrupt priorities.

13 Claims, 5 Drawing Sheets

TABLE 1

| μC | S1 PLAY | S2 FOR nX | S3 REV nX |
|---|---|---|---|
| 0 | irt1 | irt3 | irt5 |
| 1 | irt2 | irt5 | irt3 |
| 2 | irt3 | irt1 | irt4 |
| 3 | irt4 | irt6 | irt1 |
| 4 | irt5 | irt8 | irt6 |
| 5 | irt6 | irt4 | irt7 |
| 6 | irt7 | irt7 | irt8 |
| 7 | irt8 | irt2 | irt2 |

FIG. 6
TABLE 1

| μC | S1 PLAY | S2 FOR nX | S3 REV nX |
|---|---|---|---|
| 0 | irt1 | irt3 | irt5 |
| 1 | irt2 | irt5 | irt3 |
| 2 | irt3 | irt1 | irt4 |
| 3 | irt4 | irt6 | irt1 |
| 4 | irt5 | irt8 | irt6 |
| 5 | irt6 | irt4 | irt7 |
| 6 | irt7 | irt7 | irt8 |
| 7 | irt8 | irt2 | irt2 | though digital disk drives or hard drives may be substituted.

INTERRUPT PRIORITIZATION IN A DIGITAL DISK APPARATUS

CROSS REFERENCE TO RELATED APPLICATIONS

This application is a continuation-in-part of an earlier filing date under 35 U.S.C, 120, from application Ser. No. 09/024,232 filed Feb. 17, 1998 now U.S Pat. No. 6,320,826 which claims benefit from provisional application Ser. No. 60/039,573 filed Feb. 18, 1997.

FIELD OF THE INVENTION

This invention relates to the reproduction of a digitally encoded signal from a disk medium and in particular to optimizing reproduction at other than play speed.

BACKGROUND OF THE INVENTION

Figure 1A:
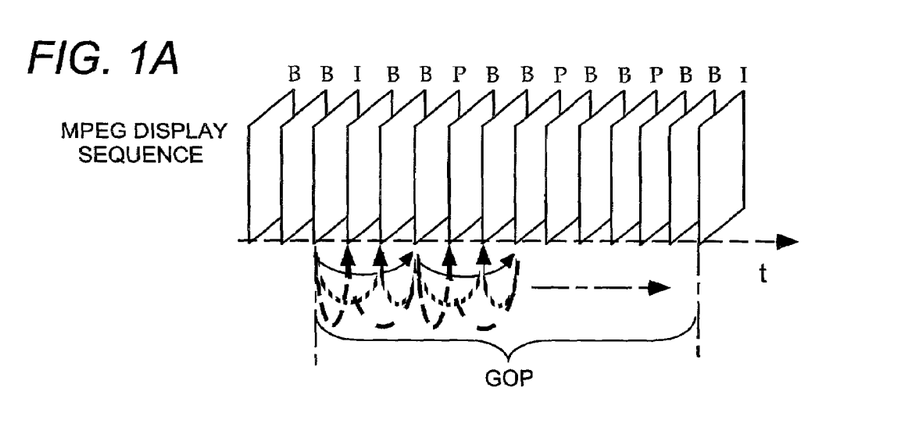
FIG. 1A illustrates an MPEG 2 group of pictures.

The introduction of disks recorded with digitally compressed audio and video signals, for example, utilizing MPEG compression protocols, offers the consumer sound and picture quality virtually indistinguishable from the original material. However, consumer users will expect such digital video disks, DVDs or hard disk drives to offer features similar to those of their analog video cassette recorder or VCR. For example, a VCR may reproduce in either forward or reverse directions at speeds other than the recorded speed. Such non-standard speed playback features are also known as trick play modes. The provision of trick play features are less easily provided with MPEG encoded video signals due to the hierarchical nature of the compression which forms pictures into groups having varying degrees of compression. These groups are termed groups of pictures or GOPs, and require decoding in sequence. A detailed description of the MPEG 2 standard is published as ISO/IEC Standard 13818-2. However, in simple terms, an MPEG 2 signal stream may comprise three types of pictures having varying degrees of content compression. An intra-coded frame or I frame has the least compression of the three types and may be decoded without reference to any other frame. A predicted frame or P frame is compressed with reference to a preceding I or P frame and achieves greater degree of compression than an intra-coded frame. The third type of MPEG frame, termed a bi-directionally coded or B frame, may be compressed based on predictions from preceding and/or succeeding frames. Bi-directionally coded frames have the greatest degree of compression. The three types of MPEG frames are arranged in groups of pictures or GOPs. The GOP may for example contain 12 frames arranged as illustrated in FIG. 1A. Since only an intra-coded frame is decodable without reference to any other frame, each GOP may only be decoded following the decoding of the I frame. The first predicted frame or P frame, may be decoded and stored based on modification of the stored, preceding I frame. Subsequent P frames may be predicted from the stored preceding P frame. The prediction of P frames is indicated in FIG. 1A by the curved, solid arrow head lines. Finally, bi-directionally coded or B frames may be decoded by means of predictions from preceding and or succeeding frames, for example, stored I and P frames. Decoding of B frames by predictions from adjacent stored frames is depicted in FIG. 1A by the curved, dotted arrow head lines.

Figure 1B:
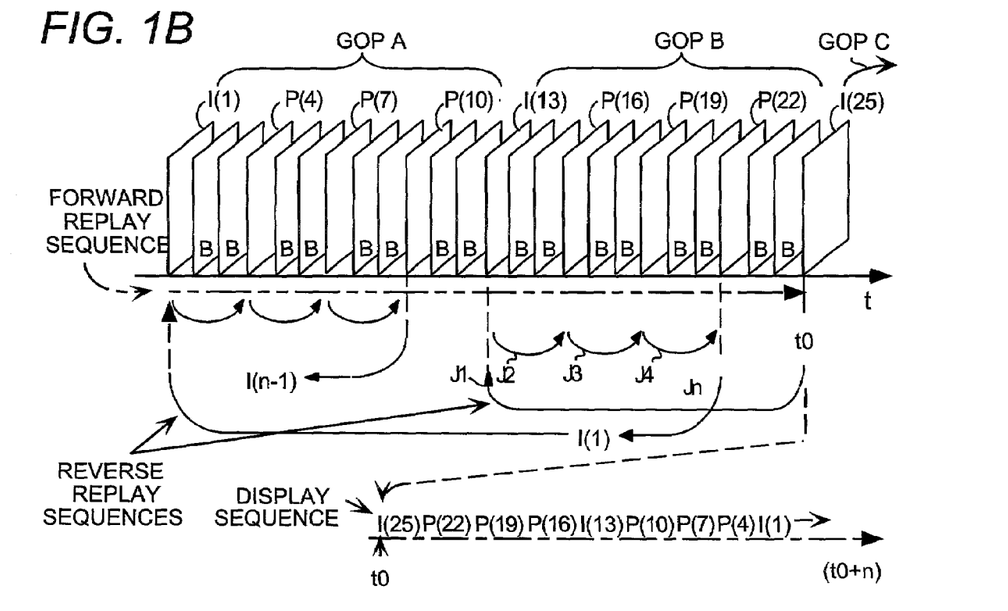
FIG. 1B illustrates recorded groups of pictures, during replay and reverse trick play at three times speed.

The hierarchical nature of the coded frames comprising MPEG groups of pictures necessitates that the I and P frames of each GOP are decoded in the forward direction. Thus, reverse mode features may be provided by effectively jumping back to an earlier, or preceding I frame and then decoding in a forward direction through that GOP. The decoded frames being stored in frame buffer memories for subsequent read out in reverse to achieve the desired reverse program sequence. FIG. 1B illustrates play back in the forward direction at normal speed and at a time prior to time t0, a reverse three times speed mode trick play mode is selected. The trick play mode is initiated at time t0 where I-frame I(25) is decoded and displayed. The next frame required for decoding is I-frame I(13), thus the transducer is repositioned, as indicated by arrow J1 to acquire frame I(13). Having recovered and decoded I-frame I(13), the transducer tracks, as indicated by arrow J2 to acquire and decode frame P(16). The process is repeated as indicated by arrows J3, J4. Following the acquisition and decoding of frame P (22) the transducer is moved as depicted by arrow Jn to recover frame I(1). To smoothly portray scene motion requires the decoding and display of I, P, and possibly B-frames. The jump and play process is repeated for preceding GOP, thereby progressing haltingly backwards through the records whilst smoothly portraying the program material in a reverse sequence at the video output.

SUMMARY OF THE INVENTION

In an digital video disk player the timely acquisition of specific data types is particularly important during trick mode operation. During trick modes a controller can be optimized to provide enhanced performance capability by employing interrupt requests having priorities that differ from those assigned for normal play mode operation. A method for controlling a microcontroller in digital disk apparatus having at least two reproducing modes comprises the steps of prioritizing the microcontroller interrupts during a first reproducing mode, and in a second reproducing mode reordering the microcontroller interrupt priorities. In a third reproducing mode the reordered interrupt priorities are changed, and certain ones of the changed reordered interrupt priorities are deleted.

DETAILED DESCRIPTION

Figure 2:
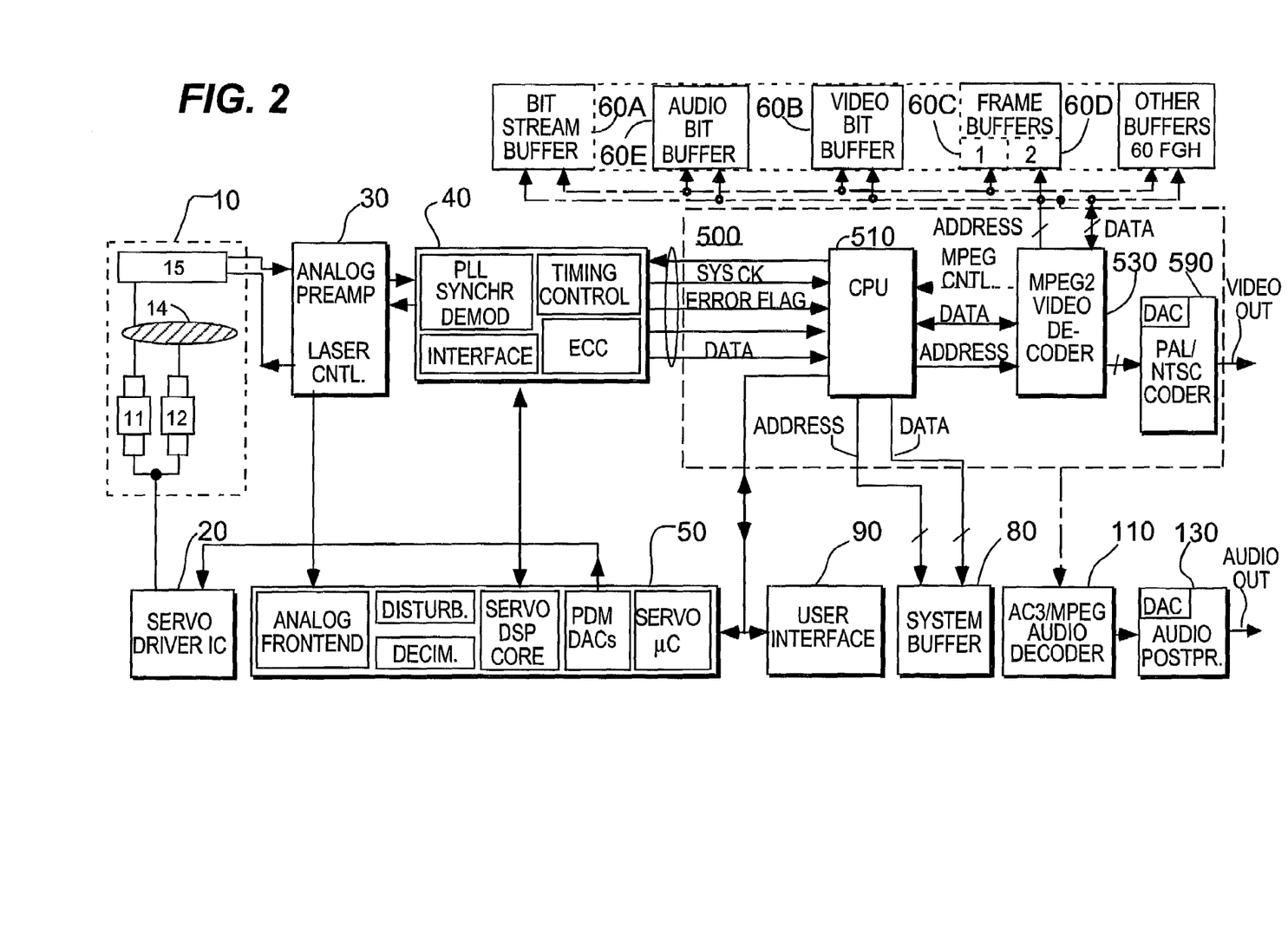
FIG. 2 is a block diagram of an exemplary digital video disk player including inventive arrangements.

FIG. 2 depicts an exemplary block diagram of a digital video disk player. In block 10 a deck is shown which may accept a digitally recorded disk 14 for rotation by a motor 12. A digital signal is recorded on disk 14 as a spiral track containing pits with respective pit lengths determined by an 8/16 modulation coding responsive to respective signal data bits. The record on disk 14 is read by pick up 15 which gathers reflected illumination from a laser. The reflected laser light is collected by a photo detector or opto pick-up device. An imaging device, for example a lens or mirror, which form part of transducer pick-up 15, is servo controlled and driven by motor 11 to follow the recorded track. Different parts of the recording may be accessed by rapidly repositioning the imaging device. Servo controlled motors 11 and 12 are driven by integrated circuit drive amplifier 20. Pick up 15 is coupled to an opto preamplifier, block 30, which includes drive circuitry for the laser illuminator and a preamplifier which provides amplification and equalization for the reflected signal output from the opto pick-up device. The amplified and equalized replay signal from opto preamplifier 30 is connected to a channel processor block 40 where the replay signal is employed to synchronize a phase locked loop which is utilized to demodulate the 8:16 modulation employed for recording.

The MPEG encoded bitstream is encoded for error detection and correction by means of Reed Solomon product coding which is applied in blocks of 16 sectors, where each sector contains 2048 bytes of payload data. Thus following 8:16 demodulation the replay data stream is de-interleaved or unshuffled and error corrected by means of Reed Solomon product correction implemented in ECC buffer memories 45 and 46 of FIG. 4. Each buffer stores 16 sectors of the replay data stream arranged as an array to facilitate de-interleaving and to enable the required row and column product processing. The cascaded ECC buffer memories introduce a delay to reproduced serial bit stream of approximately (2*16*1.4) milliseconds, where 2 represents the pair of ECC buffers, 16 represents the sectors over which the correction is applied and 1.4 milliseconds represents a sector period at 1X rotational speed. Thus the reproduced serial bit stream is delayed by a minimum of approximately 45 milliseconds.

The error corrected signal bitstream 41 is coupled via a link processor to a bit stream or mechanical/track buffer memory 60A. The track buffer comprises a DRAM memory type and is used to store an amount of replayed data such that data losses during transducer or pickup 15 repositioning will not result in any visible deficiency when decoded. Thus the final output image stream will appear to be continuous or seamless to the viewer. Bitstream buffer memory 60A is part of an exemplary 16 megabit DRAM memory. A further exemplary 16 megabit SDRAM memory block is partitioned to provide frame buffers 60C and 60D which provide storage for at least two decoded image frames of compressed video bit stream storage prior to decoding and storage in buffer 60B, an audio bit stream buffer 60E and other storage in buffers 60F, G and H. The channel processor 40 also includes timing control circuitry which control writing by link 505 to bitstream buffer 60A. Data may be intermittently written to the bitstream buffer as a consequence of changes in replay track addresses, for example, resulting from user defined replay video content choices such as "Directors cut", parental guidance, or even user selectable alternative shot angles. To facilitate more rapid access and recovery of the recorded signal, disk 14 may be rotated at an increased speed resulting in the transduced bitstream having a higher bit rate, and possibly intermittent delivery.

The digital video disk player is controlled by a central processing unit or CPU element 510, for example ST Microelectronics type ST20, of block 500, which accepts the reproduced bitstream and error flags from channel IC 40, and provides control instructions to servo IC 50. In addition, CPU 510 accepts user control commands from user interface 90, and MPEG decoder control functions from the MPEG decoder element 530 of block 500. A system buffer memory 80 is addressed by and provides data to CPU 510. For example, buffer 80 may comprise both RAM and PROM memory locations. The RAM may be used to store various data extracted from bitstream 41 by CPU 510, for example such data may include descrambling or decryption information, bitstream and frame buffer memory management data, and navigation data. The PROM may, for example contain advantageous transducer jump algorithms which facilitate trick mode operation at a selection of speeds in forward or reverse directions.

Figure 3:
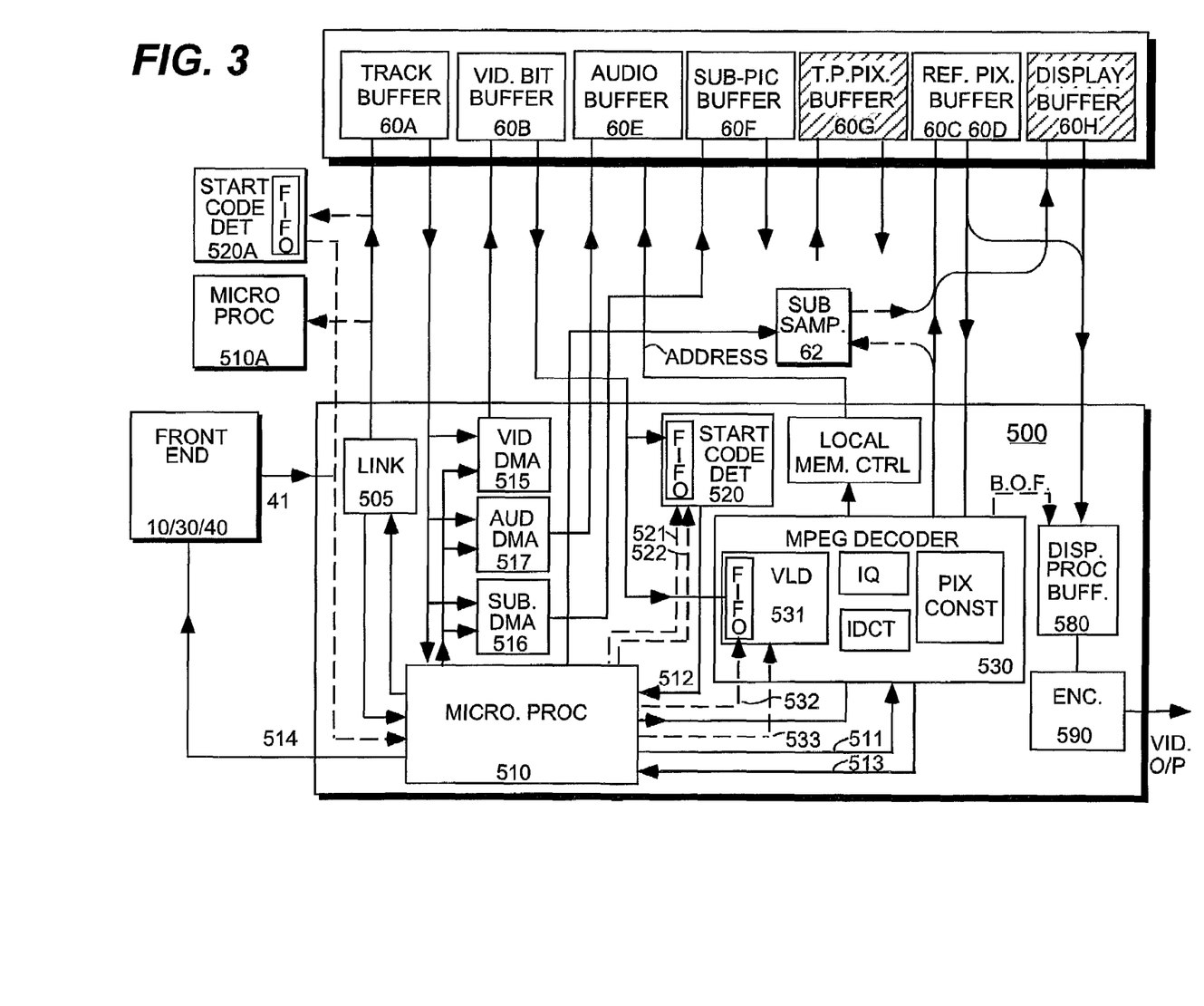
FIG. 3 is a block diagram showing in greater detail part of FIG. 2 depicting various inventive arrangements.

The MPEG encoded bitstream is coupled to link processor 505 in FIG. 3, which may function as a hardware demultiplexor to separate audio, video and control information from the encoded bitstream. Alternatively, bitstream demultiplexing may be accomplished by software control of direct memory access or DMA of buffer 60A, from CPU 510 of FIG. 3. The encoded bitstream in track buffer 60A is searched by microcontroller 510 to locate and read headers and to extract navigation data.

Having identified sector addresses or headers, microcontroller 510 controls direct memory access of buffer 60A which effectively separates MPEG data from other DVD formatted data stored in the buffer. Thus, video DMA 515 separates compressed video bits which are coupled for storage in exemplary video bit buffer 60B. Similarly compressed audio bits are read from buffer 60A and stored in audio buffer 60E. Sub-picture data is also retrieved from track buffer 60A by DMA and stored in buffer 60F.

The compressed video bit stream in video bit buffer 60B is searched to locate picture or higher level start codes by start code detector 520. A detected start code signal 512 is coupled to microcontroller 510 which then communicates with MPEG decoder 530, via signal 511, to indicate the next picture type, the quantizer setting and to initiate decoding. A decoder status signal 513 is coupled back to microcontroller 510 to indicate the completion of decoding and that picture data available for display or storage. Compressed video bit buffer 60B may be considered to function as a FIFO or circular buffer where the stored bitstream is sequentially accessed for MPEG decoding, however, trick mode operation may be advantageously facilitated by random access of buffer 60B, as will be described.

Within MPEG decoder 530 the video bit stream is processed by a variable length decoder 531 which searches the bitstream to locate slice and macro-block start codes. Certain decoded pictures from each group of pictures are written to frame buffers 60C and 60D for subsequent use as predictors when deriving or constructing other pictures, for example P and B pictures, of the GOP. Frame buffers 60C and 60D have a storage capacity of at least two video frames. Separated audio packets are stored in audio bit buffer 60E which is read out and coupled for audio decoding in block 110. Following MPEG or AC3 audio decoding a digitized audio signal results which is coupled to an audio post processor 130 for digital to analog conversion and generation of various base band audio signal outputs. A digital video output signal is reconstructed in display buffer 580 from decoded blocks read from reference frame buffer 60C/D. However, during trick mode operation the output signal source may be an advantageous field memory thus block to raster scan conversion within display buffer 580 may be advantageously controlled responsive to trick mode operation. The display buffer is coupled to encoder 590 which provides digital to analog signal conversion and generates baseband video components and encoded video signals.

Operation of the exemplary video player illustrated in FIG. 2 may be considered with reference to FIG. 1B which illustrates a forward play and reverse trick play sequence. As described previously, the coded relationship existing within each GOP necessitates that each group of pictures is decoded in a forward direction starting from an I-frame or picture. Thus, reverse mode features may be provided by effectively jumping back to transduce an earlier, or preceding I picture and then decoding in a forward direction through that GOP. The decoded pictures are stored in frame buffer memories for subsequent read out in reverse order. However, sequences that include B pictures may utilize further advantageous features which will be described. In FIG. 1B it will be assumed that at some time prior to time t0, for example at I-picture I(1), the exemplary video player assumed a forward play condition in response to a user command. Each group of pictures is decoded in the forward direction as illustrated in FIG. 1A by the arrow headed lines linking I, B and P frames. At a time prior to time t0, a three times play speed reverse trick mode is selected, and initiated at time t0 where I-picture I(25) is decoded and displayed. As previously described the next picture required for reverse trick play decoding is I-picture I(13), thus the transducer is moved, as indicated by arrow J1 to acquire picture I(13). The signal recovery and decoding then follows a play sequence indicated in FIG. 1B by arrows J1, to acquire I(13), J2, to acquire P(16), J3, to P(19), J4 to P(22) . . . Jn. The intervening B pictures shown in FIG. 1B are transduced but may be discarded as required by each specific trick play mode. To avoid the previously described requirement for additional reverse mode video buffering, various advantageous methods for MPEG decoder control and buffer control and allocation are employed.

The location and determination of start codes prior to picture decoding may be facilitated by an arrangement which utilizes the link interface block 505 of FIG. 3 to search for start codes in the bitstream prior to buffer 60A. Such use of link interface 505 advantageously provides early pre-processing of picture headers which may be signaled to microprocessor 510. Thus, having identified picture headers, pictures wanted by a specific trick mode may be stored in exemplary track buffer 60A with unwanted pictures deleted by overwriting in the buffer.

The processing of the video packet stream prior to the video bit buffer 60B may be advantageously employed for trick mode operation. For example, at a trick play speed or in a reverse replay mode, such pre-processing permits trick play specific selection between pictures to be buffered for decoding, and those unwanted pictures to be discarded before decoding. Such picture selection, for example discarding B-frames, may approximately double the number of I and P pictures stored in video bit buffer 60B during trick play operation. Thus by selection and deletion, video bit buffer 60B stores only wanted, or trick play specific pictures, hence more video object units or VOBUs may be stored facilitating enhanced trick play operation.

It is advantageous to control MPEG picture decoding order based on knowledge of where the pictures start and stop in the video bit buffer. Thus knowledge of picture location in the video bit buffer 60B allows memory start pointers in the start code detector 520 and variable length detector 531 to be directed to effectively randomly access pictures from the video bit buffer as required, for example, during trick mode operation. Operation at reverse at play speed and or slow motion playback requires the reproduction of B-frames. Such reverse mode operation may be advantageously simplified in terms of buffer memory requirements by reversing the order in which adjacent B pictures are decoded. This reversal of decoding order is achieved by setting the memory start pointers to enable decoding of the picture required by the trick mode. In addition buffer memory size and control may be simplified during trick play operation by advantageously skipping or not reading pictures in the video bit buffer as required by specific trick play algorithms. Trick play buffer memory size and control may be advantageously optimized by enabling multiple decoding of pictures either immediately or as specifically required by the trick play algorithm. The facilitation of these advantageous features requires careful control of read/write functions and the synchronization therebetween.

Figure 4:
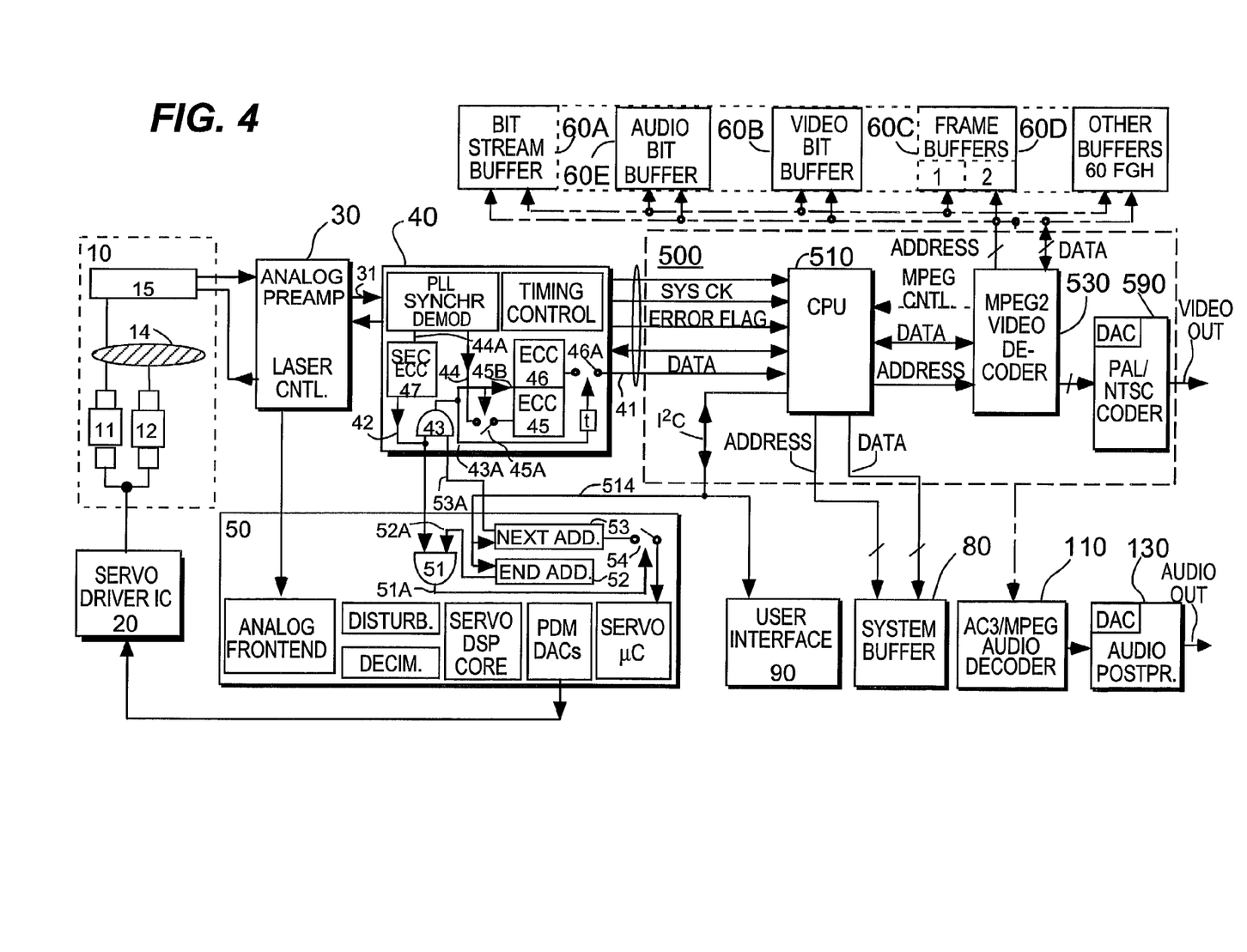
FIG. 4 is a block diagram depicting in detail inventive arrangements of FIG. 2.

The block diagram of FIG. 4 shows the same functions and element numbering as depicted in FIG. 2, however, FIG. 4 includes additional advantageous arrangements which will be explained. The exemplary digital video disk player shown in FIGS. 2, 3 and 4 may be considered to comprise two parts namely a front end and a back end. The front end controls the disk and transducer with the back end providing MPEG decoding and overall control. Such functional partitioning may represent an obvious solution for consistent, steady state, MPEG decoding. However, such partitioning of processing with control from the back end may result in microcontroller overload, for example, during trick mode operation and particularly in the reverse direction.

In FIG. 4 control data is transmitted by an I$^2$C control bus 514, which communicates the next wanted replay sector address to servo control system 50. The next wanted replay sector address is generated by microcontroller 510 which processes address data originating from a stored trick play, speed specific sequence, replayed and stored navigation data, or from advantageously determined replayed picture data. The next address is read from the I$^2$C bus and stored in element 53. The I$^2$C data also includes an advantageous end/last sector address, or first unwanted sector address. The end/last sector address may be obtained from recovered and stored navigation data, however this provides only a limited number of predetermined picture addresses, thus for trick modes the advantageously determined end of picture sector addresses are employed. The end/last sector address is read from the I$^2$C bus and stored in element 52. The last sector address may modified either prior to bus transmission or upon receipt, to prevent wanted sector loss, by for example, the addition of one unit count to sector address thus ensuring addressing and detection of the first unwanted sector. The last sector address, or modified address 52A is coupled for comparison with the replay sector address signal 42 in an exemplary comparator 51. Thus, when the replay sector address 42 equals address 52A, the first unwanted sector is about to be transduced and comparator 51 generates control signal 51A. Control signal 51A enables coupling from element 53, for example by loading or shifting the stored address data to the servo, or as depicted by exemplary selector switch 54 which couples the next sector address to the servo system and initiates repositioning of transducer 15. As has been described, the transducer is moved to the track containing the next wanted picture and data output signal 41 is advantageously enabled by element 43 when the wanted picture is reproduced.

The transducer continues to follow the track reproducing wanted sectors which are processed by the back end. In response to data recovered from these sectors a new pair of next and end sector addresses are generated and transmitted via the I$^2$C bus. These new address are received and stored as before in elements 52 and 53. However to avoid initiating a transducer jump before the new end sector address is replayed and detected by element 51, exemplary selector 54 is reset or opened preventing premature initiation and acquisition of the new sector address.

A further advantageous arrangement recognizes that control requirements differ between operational modes and such differences can be beneficially exploited to allow processor time to be directed to trick mode specific tasks. Hence microcontroller interrupts, both internal and external to the microcontroller are assigned different or reordered priorities, and or inhibited in accordance with the operational mode. Such mode specific interrupt prioritization can reduce or eliminate wasted CPU time servicing inconsequential interrupts or requests rendered irrelevant by playback mode selection.

For example, during normal play speed operation CPU 510 is generally concerned with obtaining and decoding data to form the next picture required for display and as such the sequence of events is largely determined by the display rate. Clearly audio data acquisition and decoding have similar CPU timing or priority needs. Responsiveness to user control commands is important but of lower CPU importance that a temporally smooth, non-repeated flow of pictures. The provision of sub pictures in response to user selection is of yet lower CPU importance but clearly the system must not impose an unacceptable user delay.

The various trick replay modes generally have control requirements that differ from each other and from normal play operation. For example slow motion in a forward direction poses few control problems since the required extra pictures can be provided by controllably repeating the current display picture and decoding a new picture when the currently displayed picture is to be changed. Since audio is not required, decoding is inhibited, but the audio buffer is emptied occasionally to prevent the generation of an overflow interrupt which, although irrelevant wastes processor time.

In a fast forward trick mode CPU timing and control become important, for example at twice speed the decoding frame rate must be increased with certain decoded pictures being discarded or not displayed from the display buffer. In trick mode operation the display memory control and decode complete flags are no longer locked to the frame rate hence the controller must respond more quickly. To achieve the exemplary speedup, the display processor may need to display fields instead of frames. Thus interrupts need to run twice as fast (2× frame rate) and in addition certain pictures, for example B pictures from the display buffer will be skipped. The start code detector must to be started faster and earlier than the display rate in order to find and either discard compressed pictures or decode them at a rate faster than they are displayed. In addition processor time can not be spent emptying the audio buffer since the data is not decoded and the buffer interrupt wastes processor time, thus audio interrupts can be inhibited.

The various MPEG buffer memories must be monitored closely and their fullness maintained since data is flowing faster than during normal play operation. In addition buffer control can be assigned an opposite polarity than normal MPEG processing, since during forward play operation the input or track buffer is kept from overflowing, however in trick modes an underflow condition is more likely to occur. However, at some point the buffers will become empty and data is lost terminating the current decoding process. Decoding is then resumed by jumping ahead to the next I-picture. In addition the user may attempt to find a specific scene by changing or varying replay rates and direction, hence user command priorities must be processed promptly requiring a higher interrupt priority than slow or play speed operation.

Thus it can be appreciated that the entire CPU system dynamics are different with trick mode operation and changing interrupt priorities can more effectively accommodate the trick mode features, shutting down some interrupts like audio, and sub-picture processing, increasing the MPEG buffer interrupt priority, and lowering the buffer full flag from the front end can help the system process data during trick mode operation.

Reverse trick modes, and in particular reverse play speed operation, is exceptionally problematic since often the same picture data is acquired and decoded multiple times to construct reference pictures that are temporally too early to be displayed. The controller can become sufficiently taxed that servicing interrupts may limit the performance.

The microcontroller 510, of FIGS. 2, 3 and 4 is advantageously controlled in response to user selected replay mode, for example, play, fast forward, reverse, such that interrupts coupled to the microcontroller are assigned different priorities depending on the selected operating mode. Microcontroller 510, for example an ST Microelectronics type ST20, allows either internal or external interrupt signals to interrupt a currently running CPU process. This exemplary microcontroller facilitates the prioritization of interrupts by use of an interrupt controller and interrupt level controller. The interrupt level controller is controlled by software which determines or controls multiplexing of the incoming interrupts onto eight interrupt inputs of the interrupt controller. Advantageously, a selected operating mode, play, fast forward, reverse, ect., which is executed by the microcontroller is also employed to select different control software for coupling to determine the multiplexing of incoming interrupt requests to prioritized inputs of the interrupt controller. Thus external interrupt inputs can be multiplexed to achieve a reordered input sequence when coupled to the priority controller. In this way certain external interrupt signals are dynamically assigned interrupt priority levels which change in response to the selected replay modes.

Figure 6:
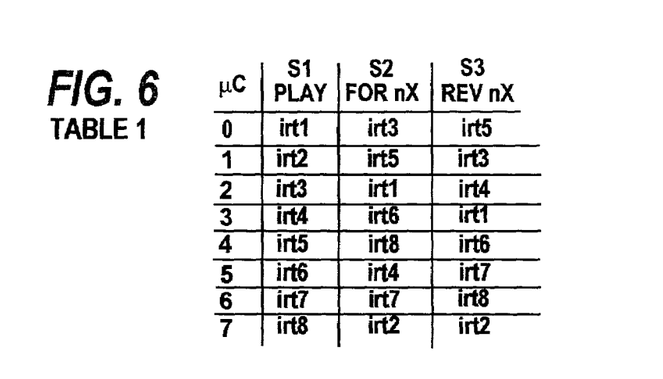
FIG. 6 is an exemplary TABLE 1 showing interrupt reprioritization between controller interrupt inputs.

The software control of interrupt priorities in response to play back mode is shown in TABLE 1 of FIG. 6, with examples of selector and multiplexor 551 reordering external interrupt signals (irt(n)) between interrupt inputs (μC 0–7) of interrupt controller 560, in accordance with three exemplary reproducing modes.

In the following table (TABLE 2) exemplary parameters are shown associated with microcontroller 510. However, these various exemplary assignments and reassignments of priority, are determined not only by the complexities of MPEG trick mode decoding, but also with regard to the specific requirements of the subject microcontroller. For example, in TABLE 2 it is apparent that remote control decoding, IR/PWM is maintained with the highest interrupt priority regardless of the selected reproduction mode. This requirement is specific to the microcontroller in which buffer memory capacity for I.R. remote control instructions is small, consequently to maintain user control and prevent interrupt hang-ups the interrupt is assigned the highest priority.

TABLE 2

| μC | S1<br>PLAY | S2<br>For nX | S3<br>Rev nX |
|---|---|---|---|
| 0 | IR/PWM | IR/PWM | IR/PWM |
| 1 | Input DMA full | video decode | video decode |
| 2 | video decode | Input DMA full | I²C |

TABLE 2-continued

| μC | S1 PLAY | S2 For nX | S3 Rev nX |
|---|---|---|---|
| 3 | audio decode | OSD | OSD |
| 4 | sub-pic. decode | audio decode | Input DMA full |
| 5 | cc inter | I²C | audio decode |
| 6 | OSD | cc inter | cc inter |
| 7 | I²C | sub-pic. decode | sub-pic. decode |

The following nomenclature is used in TABLE 2:
IR/PWM=Infra red, pulse width modulated control code.
Input DMA full=indication of full state in exemplary track buffer 60A.
Video decode=MPEG video decoder interrupt request.
Audio decode=MPEG/AC3 audio decoder interrupt request.
Sub-pic. Decode=MPEG sub-picture decoder interrupt request.
Cc inter.=closed caption interrupt request decoded from the MPEG stream.
OSD=on screen display, player system request.
I²C=Inter integrated circuit bus.

The hierarchical nature the MPEG signal necessitates that I and P frames are decoded in a forward direction, thus reverse mode reproduction can be facilitated by jumping back to an earlier, or preceding I frame and then decoding, possibly multiple times in a forward direction through that GOP. Clearly these trick mode complexities discussed herein are not confined to digital video disk reproduction and are equally applicable to other storage media, such as hard disks, recordable disks etc. The inventive reassignment of CPU interrupt priorities permits the optimization of CPU processing time during MPEG trick mode operation from any storage medium.

Figure 5:
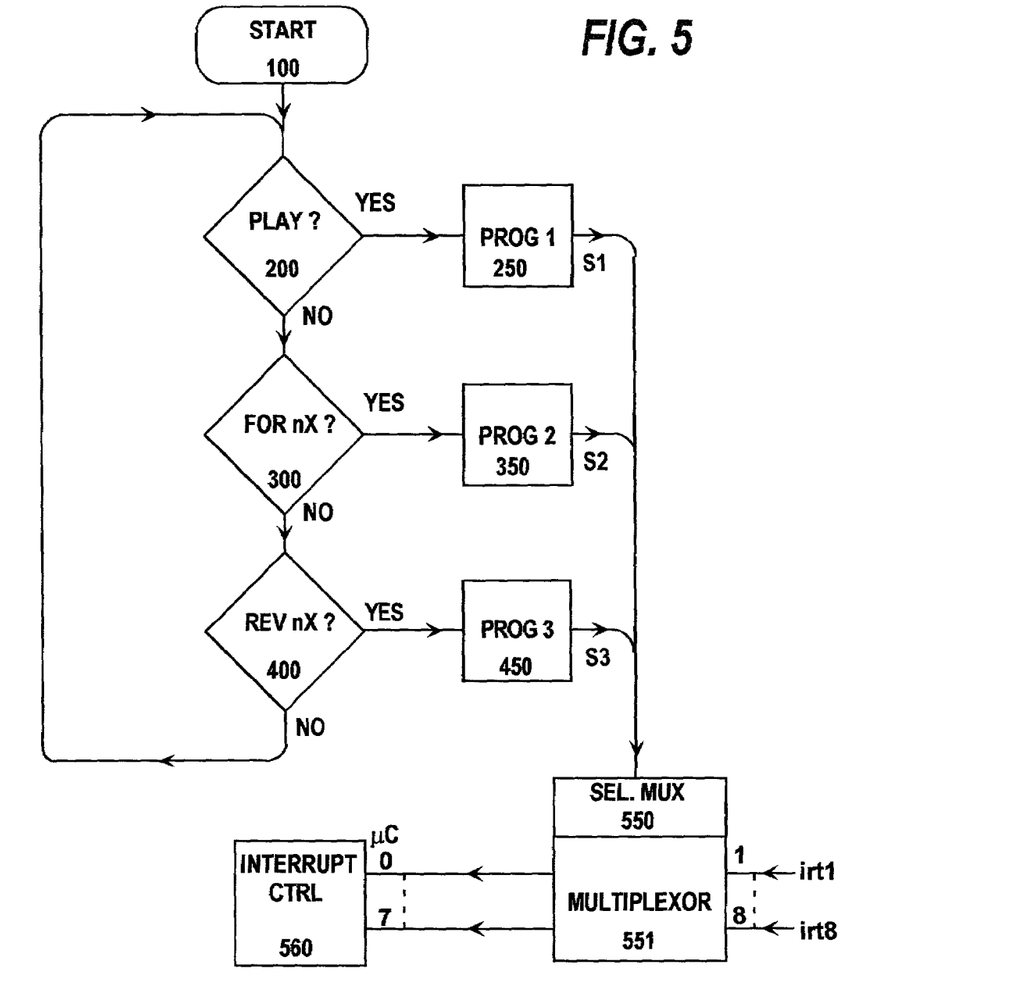
FIG. 5 depicts an exemplary control sequence in accordance with an inventive arrangement of FIG. 4.

FIG. 5 depicts exemplary control sequences for microcontroller 510 that permit the assignment of different interrupt priorities in accordance with selected operating modes. At block 100 of FIG. 5, mode dependent interrupt priority assignment is initiated. A test is performed at step 200 to determine if the selected operating condition is a normal PLAY mode, a YES results in the acquisition of a software program 1 from a memory location. Software program 1 (S1) is applied to select multiplexor 550 (SEL MUX) and determines coupling or routing, provided by multiplexor 551, of external interrupt request signals (irt(n)) to prioritized inputs of interrupt controller 560.

If step 200 tests NO, a further test is performed at block 300 to determine if a fast forward (FOR nX) reproduction mode has been selected, for example 6X. A YES causes software program 2, (S2) to be acquired from memory and coupled to multiplexor 550 to determine the coupling of external interrupt signals by multiplexor 551 to the prioritized inputs of interrupt controller 560.

However if step 300 tests NO, a further test is performed at block 400 to determine if a REVERSE (REV nX) reproduction mode has been selected, for example −3X. As described previously a YES causes software program 3 (S3) to be coupled to determine the setting of multiplexor 550 and thus the coupling of external interrupt signals to interrupt controller 560. If step 400 tests NO the sequence returns to block 200 which initiates a loop that monitors for the selection of ones of the plurality of reproducing modes such that an optimum predetermined interrupt priority is selected specific to the chosen operating mode. The advantageous recognition of differing control requirements during different operational modes beneficially allows processor time to be directed to trick mode specific tasks which facilitate temporally smoother image presentation.

What is claimed is:

1. A method for controlling a microcontroller in a digital disk apparatus having at least two reproducing modes, comprising:
   prioritizing microcontroller interrupts during a first reproducing mode;
   assigning a new interrupt priority value to at least a first of said microcontroller interrupts during a second reproducing mode; and
   inhibiting interrupt inputs in accordance with the priority value and one of first reproducing mode and second reproducing mode to permit enhanced performance of the microcontroller.

2. The method of claim 1, wherein said prioritizing step comprises:
   selecting a normal speed forward play mode as said first reproducing mode.

3. The method of claim 2, wherein said assigning step comprises:
   selecting a reverse reproduction mode as said second reproducing mode.

4. The method of claim 1, wherein said assigning step comprises:
   selecting as said second reproducing mode a reproducing mode having a speed greater than said first reproducing mode.

5. The method of claim 1, comprising the further step of deleting at least one interrupt from said prioritized microcontroller interrupts during said second reproducing mode.

6. The method of claim 5, comprising the further step of deleting an audio interrupt from said prioritized microcontroller interrupts during said second reproducing mode,
   assigning an new interrupt priority value to at least at first of said microcontroller interrupts during reproduction in a reverse direction; and
   inhibiting interrupt inputs in accordance with the priority value and one of forward normal play speed reproduction and reverse direction reproduction to permit enhanced performance of the microcontroller.

7. The method of claim 1, comprising the step of assigning a new interrupt priority value to at least a second of said microcontroller interrupts during a third reproducing mode.

8. The method of claim 7, wherein said new interrupt priority values assigned to said first and second of said microcontroller interrupts are selected for a reverse play mode in said third reproducing mode.

9. The method of claim 1, comprising the step of deleting at least one of said microcontroller interrupts during a third reproducing mode.

10. The method of claim 1, wherein said assigning step comprises selecting reproduction in a reverse direction as said second reproducing mode.

11. A method for controlling interrupt priorities in a digital disk replay apparatus having a microcontroller, comprising:
   applying microcontroller interrupts in accordance with a first priority during normal play speed reproduction;
   assigning a new interrupt priority value to at least a first of said microcontroller interrupts during reproduction at a multiple of normal play speed; and
   inhibiting interrupt inputs in accordance with the priority value and one of normal play speed reproduction and reproduction at a multiple of normal play speed to permit enhanced performance of the microcontroller.

12. A method for controlling interrupt priorities in a digital disk replay apparatus having a microcontroller, comprising:
   applying microcontroller interrupts in accordance with a first priority during forward normal play speed reproduction.

13. A method for controlling interrupt priorities in a digital disk replay apparatus having a microcontroller, comprising:
   applying microcontroller interrupts in accordance with a first priority during normal play speed reproduction;
   changing said first priority of interrupts by assigning a new interrupt priority value to at least one of said microcontroller interrupts during reproduction at a speed different from said normal play speed reproduction; and
   inhibiting interrupt inputs in accordance with the priority value and one of normal play speed reproduction and reproduction at a speed different from said normal play speed direction to permit enhanced performance of the microcontroller.

* * * * *